US 8,950,531 B2

(12) United States Patent
Urabe (10) Patent No.: US 8,950,531 B2
(45) Date of Patent: Feb. 10, 2015

(54) INTERNAL MOTORIZED BICYCLE HUB (75) Inventor: Hiroyuki Urabe, Osaka (JP)

(73) Assignee: Shimano Inc., Osaka (JP)

(*) Notice: Subject to any disclaimer, the term of this patent is extended or adjusted under 35 U.S.C. 154(b) by 515 days.

(21) Appl. No.: 13/329,494

(22) Filed: Dec. 19, 2011

(65) Prior Publication Data
US 2012/0161496 A1    Jun. 28, 2012

(30) Foreign Application Priority Data

Dec. 24, 2010 (JP) ................. 2010-288202

(51) Int. Cl.
*B60B 27/06* (2006.01)
*B62M 6/40* (2010.01)
*B62M 6/65* (2010.01)
*B60B 27/00* (2006.01)

(52) U.S. Cl.
CPC ............. *B62M 6/65* (2013.01); *B60B 27/06* (2013.01); *B62M 6/40* (2013.01); *B60B 27/0005* (2013.01); *B60B 27/065* (2013.01)
USPC ........... 180/65.51; 180/205.1; 180/206.1; 180/206.5; 180/206.6; 301/6.5; 310/75 R (58) Field of Classification Search
CPC ........... B62M 6/40; B62M 6/60; B62M 6/65; B60B 27/0005; B60B 27/0021; B60B 27/02; B60B 27/023; B60B 27/06; B60B 27/065
USPC ........... 180/65.51, 65.6, 205.1, 206.1, 206.5, 180/206.6; 301/6.5; 310/75 R, 75 C, 67 A, 310/83; 384/517, 518, 545
See application file for complete search history.

(56) References Cited

U.S. PATENT DOCUMENTS 2,514,460 A * 7/1950 Tucker ................. 310/67 R
2,956,632 A * 10/1960 Forbush et al. .......... 180/385
3,304,051 A * 2/1967 Calhoun ................... 415/80
(Continued)

FOREIGN PATENT DOCUMENTS

DE   19952580 A1   5/2001
EP    1547815 A2 * 6/2005 ............. B60B 27/02
(Continued)

OTHER PUBLICATIONS

Koyo Training Manual, Section 4—Bearing Tolerances, Fits, & Clearance, p. 68.*
(Continued)

*Primary Examiner* — J. Allen Shriver, II
*Assistant Examiner* — Steve Clemmons
(74) *Attorney, Agent, or Firm* — Global IP Counselors (57) ABSTRACT An internal motorized bicycle hub includes a hub axle, a motor, a first bearing, a second bearing, a spacer and a movement restricting section. The motor has a rotor and a stator. The first and second bearings rotatably support the rotor on the hub axle. The second bearing is axially spaced apart from the first bearing. Each of the first and second bearings includes an inner race attached to the hub axle, an outer race attached to the rotor, and a rolling element arranged between the inner and outer races. The spacer is arranged between the inner races. The movement restricting section restricts movement of the inner race of the first bearing in a direction of separating from the bearing of the second bearing. The spacer presses the bearing of the first bearing towards the movement restricting section.

9 Claims, 5 Drawing Sheets

(56) References Cited

U.S. PATENT DOCUMENTS

| | | |
|---|---|---|
| 4,346,777 A | 8/1982 | Restelli |
| 5,450,915 A | 9/1995 | Li |
| 5,597,242 A * | 1/1997 | Beeler .......................... 384/517 |
| 5,600,191 A | 2/1997 | Yang |
| 5,782,716 A | 7/1998 | Hukui et al. |
| 6,100,615 A | 8/2000 | Birkestrand |
| 6,229,237 B1 * | 5/2001 | Obara et al. .................... 310/90 |
| 6,276,475 B1 | 8/2001 | Nakanosono |
| 6,355,996 B1 * | 3/2002 | Birkestrand ................... 310/54 |
| 6,786,645 B2 * | 9/2004 | Joki et al. ..................... 384/488 |
| 7,186,030 B2 * | 3/2007 | Schlanger ..................... 384/545 |
| 7,731,428 B2 * | 6/2010 | Kuan ............................ 384/545 |
| 8,016,531 B2 * | 9/2011 | White et al. .................. 411/216 |
| 2003/0067228 A1 * | 4/2003 | Vanjani .......................... 310/64 |
| 2005/0052072 A1 * | 3/2005 | Schlanger ................... 301/110.5 |
| 2005/0264112 A1 * | 12/2005 | Tanaka et al. ............... 310/75 C |
| 2006/0191764 A1 * | 8/2006 | Kanehisa et al. ............... 192/64 |
| 2009/0108667 A1 * | 4/2009 | Clark et al. .................. 301/105.1 |
| 2009/0245969 A1 * | 10/2009 | White et al. .................. 411/215 |
| 2012/0024610 A1 * | 2/2012 | Woolmer ................... 180/65.51 |

FOREIGN PATENT DOCUMENTS

| | | |
|---|---|---|
| JP | 2005335536 A | 12/2005 |
| JP | 2008-228367 A | 9/2008 |
| TW | I246974 B | 1/2006 |

OTHER PUBLICATIONS

NMBTC.com "Bearing Preload", Jan. 2, 2011.*

\* cited by examiner

INTERNAL MOTORIZED BICYCLE HUB

CROSS-REFERENCE TO RELATED APPLICATIONS

This application claims priority under 35 U.S.C. §119 to Japanese Patent Application No. 2010-288202, filed Dec. 24, 2010. The entire disclosure of Japanese Patent Application No. 2010-288202 is hereby incorporated herein by reference.

BACKGROUND

1. Field of the Invention

This invention generally relates to a bicycle hub. More specifically, the invention relates to an internal motorized bicycle hub in which a hub axle and an inner race of a bearing supporting a rotor do not easily become worn.

2. Background Information

An assisted bicycle is known in which a drive force imparted by human power is supplemented with a motor. In some cases, an assisted bicycle is provided with a bicycle hub that is equipped an internal motor. Typically, a conventional internal motorized bicycle hill) has a rotor that is supported by a left-right pair of roller bearings (e.g., see Japanese Laid-Open Patent Publication No. 2005-335536). The conventional bicycle hub also has an inner rotor structure that is rotatably supported on a hub axle with a left-right pair of roller bearings. Normally, the roller bearings are installed such that one of the inner race and the outer race is attached with an interference or friction fit and the other race is attached with a clearance fit. A conventional bearing is installed from one side of the rotor. Typically, a conventional roller bearing is installed such that the inner race is attached with a clearance fit and the outer race is attached with an interference fit, because the inner race is not restricted while the external diameter of the outer race is varied and restricted.

SUMMARY

In order to reduce the chances of breakage of the hub axle, it is normally preferable for the hub axle not to be quench hardened. In a conventional hub, the inner race of the bearing can move slightly in the rotational and axial directions because it is installed with a clearance fit. Thus, if the hub axle is not quench hardened, the hub axle may become worn due to the inner race slipping when the motor rotates.

One object of the present disclosure is to provide an internal motorized bicycle hub that is configured to suppress wear of the hub axle.

In view of the state of the known technology, an internal motorized bicycle hub according to a first aspect is provided that comprises a hub axle, a motor, a first bearing, a second bearing, a spacer and a movement restricting section. The motor has a rotor and a stator. The rotor is rotatably mounted on the hub axle. The stator is non-rotatably arranged with respect to the hub axle and disposed around an outer perimeter of the rotor. The first bearing rotatably supports the rotor on the hub axle. The first bearing includes a first inner race attached to the hub axle, a first outer race attached to the rotor, and a first rolling element arranged between the first inner race and the first outer race. The second bearing rotatably supports the rotor on the hub axle and is spaced apart from the first bearing along an axial direction of the hub axle. The second bearing includes a second inner race attached to the hub axle, a second outer race attached to the rotor, and a second rolling element arranged between the second inner race and the second outer race. The spacer is arranged between the first inner race and the second inner race. The movement restricting section restricts movement of the first inner race in a direction of separating from the second bearing. The spacer presses the first bearing towards the movement restricting section.

As a result of this internal motorized bicycle hub of the first aspect rotation and axial movement of the inner races can be restricted. For example, if the second inner race is pressed with a separate member or if the second inner race is attached with an interference fit, the first inner race can be pressed toward the movement restricting section by pressing the spacer. As a result, slippage of the inner races can be suppressed and wear of the hub axle and the inner races can be reduced.

An internal motorized bicycle hub according to a second aspect is provided according to the first aspect, and further comprising a pressing section that presses the second inner race toward the spacer. With this aspect, the first inner race can be pressed toward the movement restricting section by means of the pressing section pressing the second inner race toward the spacer. Thus, even if the second inner race is attached with a clearance fit, wear of the hub axle and the inner races can be suppressed.

An internal motorized bicycle hub according to a third aspect is provided according to the first or second aspect, wherein at least one of the first inner race and the second inner race is attached to the hub axle with a clearance fit. With this aspect, the second inner race can be pressed with a pressing section or other separate member if the first inner race and the second inner race are both attached with clearance fits or if only the second inner race is attached with a clearance fit. Meanwhile, the spacer can be pressed with the second inner race if the second inner race is attached with an interference fit.

An internal motorized bicycle hub according to a fourth aspect is provided according to any one of the first to third aspects, wherein the first and second outer races are attached to the rotor with interference fits, and the first and second inner races are attached to the hub axle with clearance fits. With this aspect, since the first inner race and the second inner race are attached with clearance fits, the first bearing and the second bearing can be press fitted into the rotor in advance and the rotor, the first bearing, and the second bearing can be easily attached to the hub axle as an assembled unit.

An internal motorized bicycle hub according to a fifth aspect is provided according to any one of the first to third aspects, wherein the first outer race is attached to the rotor with a clearance fit, the first inner race is attached to the hub axle with an interference fit, the second outer race is attached to the rotor with an interference fit, and the second inner race is attached to the hub axle with a clearance fit. In this aspect, the rotor and the second bearing are attached to the hub axle as an assembled unit after the first bearing has been attached to the hub axle and a sleeve has been attached to the hub axle. As a result, the hub is easier to assemble.

An internal motorized bicycle hub according to a sixth aspect is provided according to any one of the first to fifth aspects, wherein the movement restricting section has a protrusion that protrudes from an external circumferential surface of the hub axle and that contacts the first inner race. With this aspect, movement of the first inner race can be restricted in a simple manner by merely providing a protrusion on the hub axle.

An internal motorized bicycle hub according to a seventh aspect of the invention is provided according to the sixth aspect, wherein the protrusion is formed as an integral part of the hub axle. With this aspect, the number of assembly steps can be reduced because the protrusion is formed as an integral part of the hub axle.

An internal motorized bicycle hub according to an eighth aspect is provided according to any one of the first to fifth aspects, wherein the movement restricting section has an attaching member that is detachably attached to an external circumferential surface of the hub axle. With this aspect, the material and shape of the movement restricting member can be changed easily.

An internal motorized bicycle hub according to a ninth aspect is provided according to the second aspect, wherein the pressing section is a nut member that is screwed onto the hub axle. With this aspect, the spacer can be pressed using the nut member. The nut member can also be used to easily adjust a pressing force.

An internal motorized bicycle hub according to a tenth aspect is provided according to the first aspect, wherein the second inner race is attached to the hub axle with an interference fit and presses the spacer. With this aspect, the spacer can be pressed by the interference fit second inner race. The structure can be simplified by using the second inner race to press the spacer.

An internal motorized bicycle hub according to an eleventh aspect is provided according to any one of the first to tenth aspects, wherein the hub axle is made of an iron-based metal that has not been quench hardened. With this aspect, the hub axle is less likely to break. Since the hub axle is not been quench hardened, the first bearing and the second bearing do not readily slip even if a surface hardness of the hub axle is low. Consequently, the hub axle does not easily incur wear.

An internal motorized bicycle hub according to a twelfth aspect is provided according to any one of the first to eleventh aspects, wherein the internal motorized bicycle hub is a front wheel hub. With this aspect, the wear of the hub axle and the inner races of the bearings can be reduced even in front wheel hubs, which are particularly susceptible to breakage of the hub axle.

An internal motorized bicycle hub according to a thirteenth aspect is provided according to any one of the first to twelfth aspects, and further comprising a speed reducing mechanism that is connected to the rotor to reduce a rotational speed of the rotor. With this aspect, since the rotation from the motor is reduced to a lower speed by the speed reducing mechanism, the motor can be controlled at a rotational speed that is comparatively easy to control.

In the disclosed internal motorized bicycle hub, a spacer is arranged between the first inner race and the second inner race and the first inner race is pressed toward the movement restricting section by the spacer. Thus, the first inner race can be pressed against the movement restricting section by the spacer. As a result, slippage of the inner races can be suppressed and wear of the hub axle and the inner races can be reduced.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
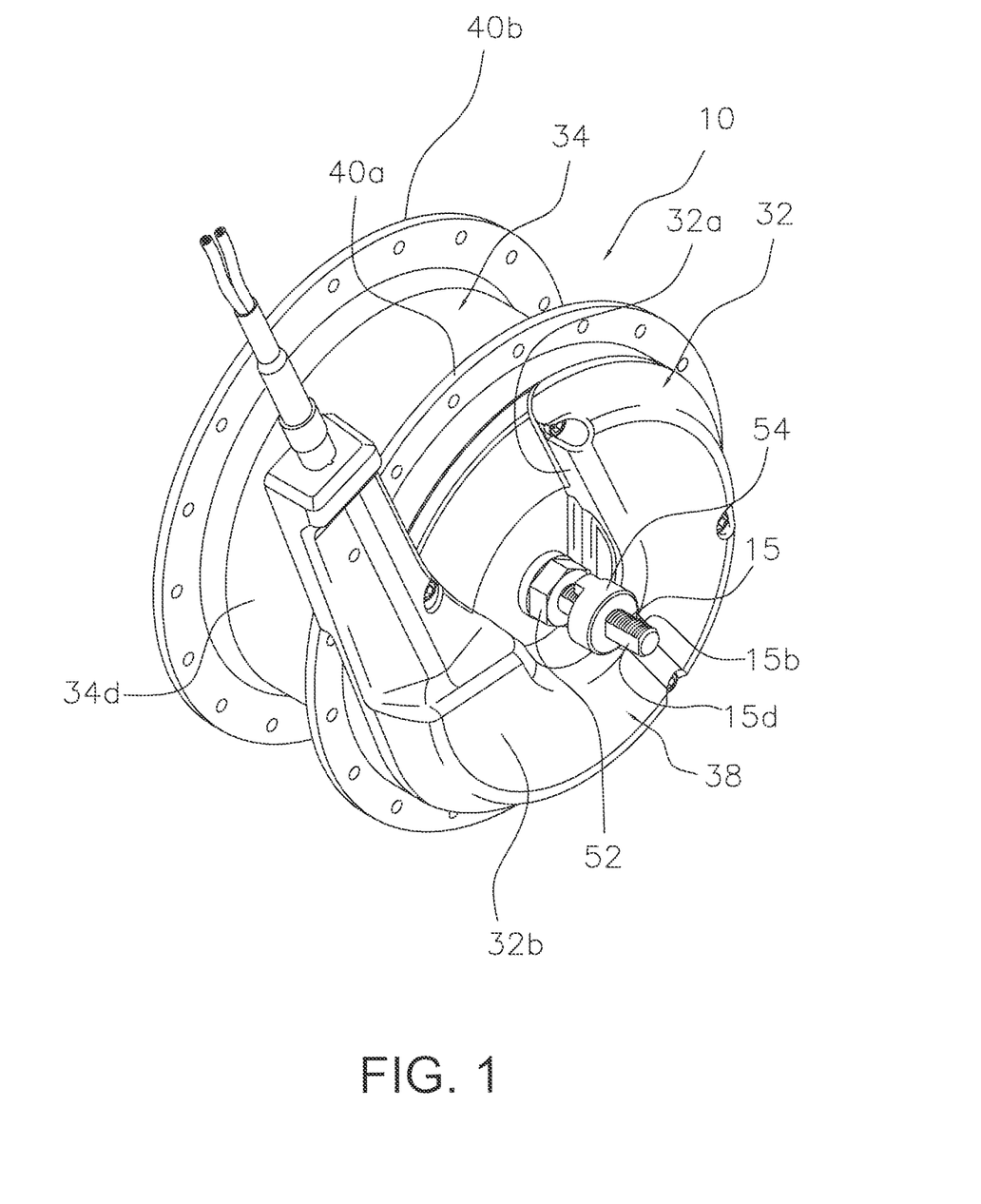
FIG. 1 is a perspective view of an internal motorized bicycle hub in accordance with a first embodiment.
Figure 2:
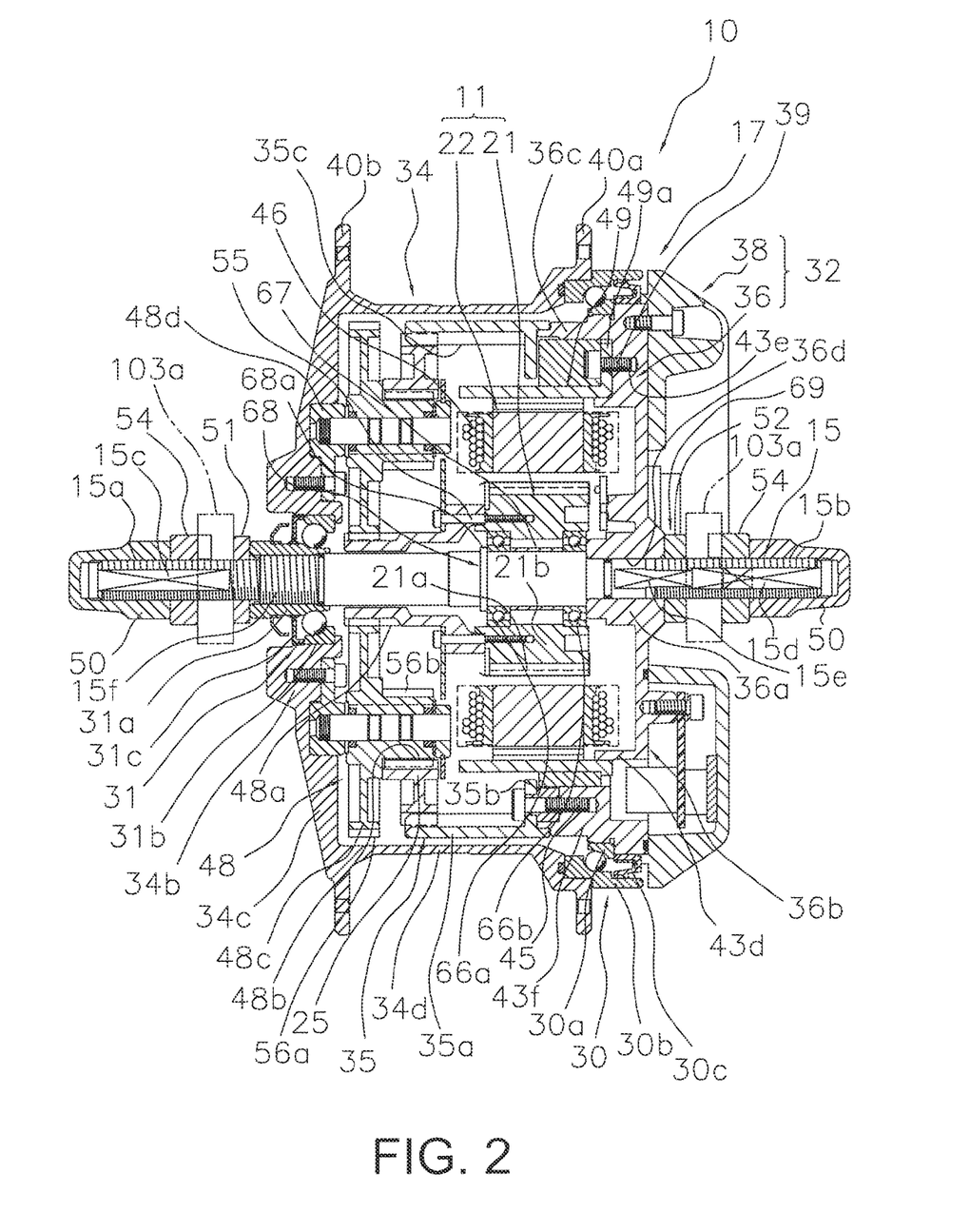
FIG. 2 is a cross sectional view of the internal motorized bicycle hub illustrated in FIG. 1.

Referring initially to FIG. 1, an internal motorized bicycle hub 10 is illustrated in accordance with a first embodiment. The internal motorized bicycle hub 10 is configured to be used in an assisted bicycle in which a drive force imparted by human power is supplemented with the internal motorized bicycle hub 10. The internal motorized bicycle hub 10 constitutes a hub for a front wheel of a bicycle. As shown in FIG. 2, the internal motorized bicycle hub 10 is attached to front fork ends 103a of a front fork of the bicycle and serves to supplement a drive force imparted by human power.

As shown in FIG. 2, the internal motorized bicycle hub 10 includes a motor 11 mounted on a hub axle 15. The internal motorized bicycle hub 10 further comprises a motor case 17 that houses the motor 11. The motor 11 has a rotor 21 configured to rotate about the hub axle 15 and a stator 22 arranged around an outer perimeter of the rotor 21 so as to be non-rotatable with respect to the hub axle 15. The internal motorized bicycle hub 10 further comprises a rotation transmitting mechanism 25 housed inside the motor case 17. The internal motorized bicycle hub 10 further comprises a bearing 30 and a bearing 31 which are explained later. The motor case 17a preferably has a first case member 32 and a second case member 34, which are explained later. The first case member 32 has a case body 36 and a cover member 38.

The internal motorized bicycle hub 10 further comprises a first bearing 66a, a second bearing 66b, a spacer 67, a movement restricting section 68, and a pressing section 69. The first bearing 66a is a roller bearing for supporting the rotor 21 rotatably on the hub axle 15. The second bearing 66b is a roller bearing that is arranged to be spaced apart from the first bearing 66a along an axial direction of the hub axle 15. The second bearing 66b serves to rotatably support the rotor 21 on the hub axle 15. The spacer 67 is arranged between the first bearing 66a and the second bearing 66b. The movement restricting section 68 serves to restrict movement of the first bearing 66a in a direction of separating from the second bearing 66b. The pressing section 69 presses the spacer 67 toward the first inner race 66a.

The hub axle 15 is made of steel or other iron-based metal that has not been quenched. The hub axle 15 is configured such that both ends can be attached non-rotatably to the front fork ends 103a. A first externally threaded section 15a and a second externally threaded section 15b are provided on external circumferential surfaces of the left and right ends of the hub axle 15. The first and second externally threaded sections 15a and 15b are configured to threadedly engage a pair (first and second) of nut members 50 to fasten the hub axle 15 to the front fork ends 103a. The first externally threaded section 15a has a first stopping section 15c that is formed on an external circumferential surface. The second externally threaded section 15b has a second stopping section 15d that is formed on external circumferential surface. Each of the stopping sections 15c and 15d has two parallel surfaces. A rotation stopping section 15e is formed on an axially inward side of the second stopping section 15d for non-rotatably connecting the first case member 32 (explained later) of the motor case 17. The first nut member 50 and a first lock nut 51 are screwed onto the first externally threaded section 15a. The second nut member 50 and a second lock nut 52 are screwed onto the second externally threaded section 15b. The second nut member 50 and the second lock nut 52 serve to fasten the first case member 32 to the hub axle 15. In this embodiment, the second lock nut 52 constitutes the pressing section 69. Rotation prevention washers 54 are installed onto the hub axle 15 on axially inward sides of the nut members 50. The rotation prevention washers 54 are configured to engage non-rotatably with each of the first stopping section 15c and the second stopping section 15d and with mounting grooves of the front fork in order to prevent the hub axle 15 from rotating.

A third externally threaded section 15f is formed on an axially inward side of the first externally threaded section 15a. The third externally threaded section 15f is configured to threadedly engage the bearing 31, which serves to rotatably support a second end of the second case member 34 (explained later) of the motor case 17. A middle portion of the hub axle 15 has a larger diameter than the first externally threaded section 15a and the second externally threaded section 15b.

A protrusion constituting the movement restricting section 68 is formed on an external circumferential surface of the hub axle 15 at a portion where the first bearing 66a is attached. In this embodiment, the movement restricting section 68 is an annular protrusion 68a that is formed as an integral part of the hub axle 15. Preferably, the annular protrusion 68a is formed as a one-piece, unitary part of the hub axle 15. The movement restricting section 68 contacts a first inner race 71a (explained later) of the first bearing 66a and restricts movement of the first inner race 71a in a direction of separating from the second bearing 66b.

As shown in FIG. 2, the first case member 32 of the motor case 17 is non-rotatably connected to the hub axle 15. The second case member 34 of the motor case 17 has a first end (right-hand end in FIG. 2) that is rotatably supported on the first case member 32 and a second end (left-hand end in FIG. 2) that is rotatably supported on the hub axle 15. The second case member 34 is made of, for example, an aluminum alloy. The case body 36 of the first case member 32 is non-rotatably attached to the hub axle 15. The cover member 38 of the first case member 32 is fastened to an outward side face of the case body 36. A space is formed between the cover member 38 and the case body 36. The case body 36 and the cover member 38 are made of, for example, an aluminum alloy. The case body 36 has a first boss section 36a, a circular partitioning wall section 36b, a first cylindrical section 36c and a non-circular connecting hole 36d. The first boss section 36a non-rotatably connects the case body 36 to the hub axle 15. The circular partitioning wall section 36b is formed as an integral unit with the first boss section 36a as a one-piece, unitary member. The first cylindrical section 36c extends from an outer periphery of the partitioning wall section 36b towards the second case member 34. A non-circular connecting hole 36d is formed through an inside of the first boss section 36a for non-rotatably connecting the case body 36 to the rotation stopping section 15e of the hub axle 15. The case body 36 is non-rotatably fixed to the hub axle 15 with the second lock nut 52.

An outward side face of the partitioning wall section 36b is a generally flat surface. The case body 36 has a cylindrical section 43d that is formed on an inward side face of the partitioning wall section 36b for adjusting a position of the stator 22 of the motor 11. An inward side face of the partitioning wall section 36b is provided with a plurality of (e.g., three) threaded holes 43e. The threaded holes 43e are provided in the partitioning wall section 36l) for fastening the stator 22 of the motor 11 with a plurality of (e.g., three) bolt members 39. The threaded holes 43e are arranged in positions radially outward from the cylindrical section 43d, and are spaced apart from one another along a circumferential direction. The case body 36 has a plurality of (e.g., three) mounting sections 43f. The mounting sections 43f are provided between the first cylindrical section 36c and the cylindrical section 43d of the partitioning wall section 36b. The mounting sections 43f are arranged to be spaced apart from one another in a circumferential direction.

In the illustrated embodiment, the bearing 30 is, for example, a ball bearing type bearing. The bearing 30 has an inner race 30a and an outer race 34b. The bearing 30 serves to rotatably support the first end of the second case member 34 that is mounted on an external circumferential surface of the first cylindrical section 36c. A cylindrical gear mounting section 35 is fitted onto an external circumferential surface of a tip end portion of the first cylindrical section 36c such that the cylindrical gear mounting section 35 is coaxial with respect to first cylindrical section 36c. As a result, the cylindrical gear mounting section 35 cannot rotate with respect to the first cylindrical section 36c. The gear mounting section 35 has a cylindrical portion 35a and a mounting portion 35b. The mounting portion 35b is provided on the end of the gear mounting section 35 that fits onto the external circumferential surface of the first cylindrical section 36c (right-hand end in FIG. 2). The mounting portion 35b has an annular shape. The mounting portion 35b is firmed integrally on an internal circumferential surface of the cylindrical portion 35a as a one-piece, unitary member. A serrated section 35c is provided on an internal circumferential surface of the other end (left-hand end in FIG. 2) of the cylindrical section 35a. The serrated section 35c serves to engage non-rotatably with an internal gear 48b (explained later). The gear mounting section 35 is fastened to the mounting sections 43f with bolt members 45.

As shown in FIG. 1, the cover member 38 has a recessed section 32a and a bulged section 32b. The bulged section 32b bulges axially outward to form the recessed section 32a. The recessed section 32a and the bulged section 32b are provided on an outward side face. The recessed section 32a is slightly wider than the shape of a tip end portion of a typical front fork in order to accommodate a variety of front fork shapes.

As shown in FIG. 2, the second case member 34 is shaped generally like a bottomed cylinder. The second case member 34 has a similar structure to a hub shell of a typical bicycle hub. The second case member 34 includes a second boss section 34b, a circular plate-like section 34c and a second cylindrical section 34d. The second boss section 34b is supported on the bearing 31. The circular plate-like section 34c is formed as an integral unit with the second boss section 34b as a one-piece, unitary member. The second cylindrical section 34d extends inward along an axial direction of the hub axle from an outer periphery of the circular plate-like section 34c.

The bearing 31 is installed between the hub axle 15 and an internal circumferential surface of the second boss section 34b. The bearing 31 has an inner race 31a and outer race 31b. The inner race 31a is screwed onto the third externally threaded section 15f of the hub axle 15 such that the inner race 31a is adjustably positioned in an axial direction. After the axial position of the inner race 31a is adjusted, the first lock nut 51 is installed to prevent the inner race 31a from rotating. The outer race 31b is installed on an internal circumferential surface of the second boss section 34b.

The second cylindrical section 34d is arranged on an outward side of the first cylindrical section 36c. The outer race 30b of the bearing 30 is installed on an internal circumferential surface of the first end side of the second cylindrical section 34d. A first hub flange 40a and a second hub flange 40b are formed on both ends of an external circumferential surface of the second cylindrical section 34d so as to be spaced apart along the axial direction of the hub. The first and second hub flanges 40a and 40b have a plurality of holes for connecting spokes between a rim of the front wheel and the internal motorized bicycle hub 10.

As explained previously, the motor 11 has the stator 22 arranged around the outside of the rotor 21 such that a radial gap is formed between the stator 22 and the rotor 21. The rotor 21 is rotatably supported on the hub axle 15. The rotor 21 comprises a magnet 21a having a plurality of magnetic poles arranged along a circumferential direction and a magnet holding section 21b that holds the magnet 21a. The magnet holding section 21b is rotatably supported on the hub axle 15 by the first bearing 66a and the second bearing 66b, which are arranged spaced apart from each other along an axial direction of the hub.

The stator 22 is arranged around the outside circumference of the rotor 21. The stator 22 is fixed to the partitioning wall section 36b of the case body 36. The stator 22 has a plurality of (e.g., twelve) coil sections 46. The coil sections 46 are arranged to be spaced apart from each other in a circumferential direction. The stator 22 has a mounting section or fitting 49 for securing the coil sections 46. The mounting fitting 49 functions as a yoke. The mounting fitting 49 is a cylindrical member made of metal and three mounting protrusions 49a that are provided on an external circumferential surface of one end of the mounting fitting 49. The mounting fitting 49 is installed on an external circumferential surface of the cylindrical section 43d. An internal circumferential surface of the mounting fitting 49 is positioned by the cylindrical section 43d. In this embodiment, the mounting fitting 49 is fastened to the partitioning wall section 36b by passing the three bolt members 39 through the protrusions 49a and screwing them into the threaded holes 43e. The coil sections 46 are excited sequentially with alternating current produced by a switching action of a motor control circuit (not shown) and cause the rotor 21 to rotate in an advancement direction of the bicycle.

Figure 3:
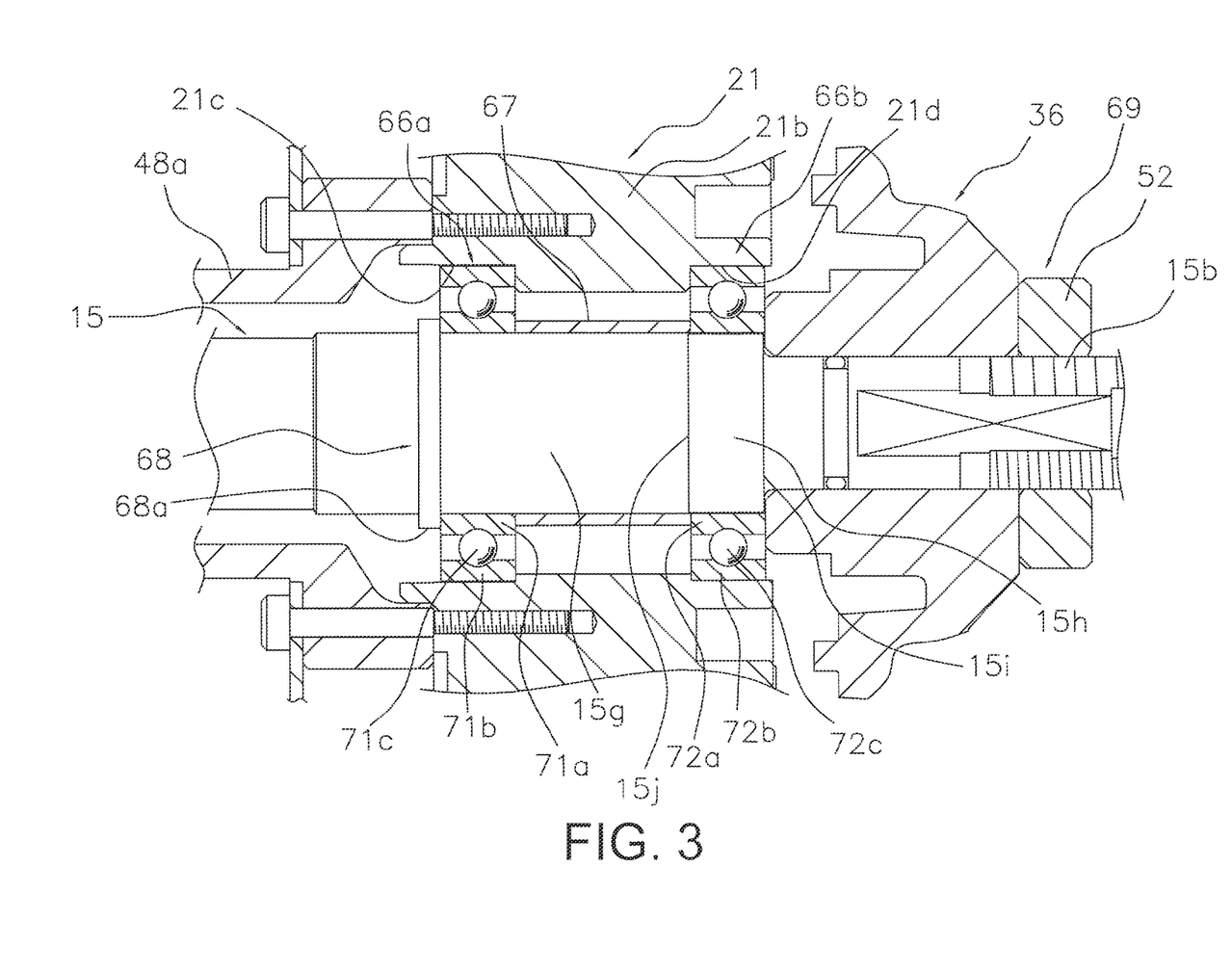
FIG. 3 is an enlarged cross sectional view of a rotor support portion of the internal motorized bicycle hub illustrated in FIGS. 1 and 2.

As shown in FIG. 3, the first bearing 66a is arranged between an external circumferential surface of the hub axle 15 and an internal circumferential surface of the rotor 21 at a first end of the rotor 21 along the direction of a rotational axis. The second bearing 66b is arranged between an external circumferential surface of the hub axle 15 and an internal circumferential surface of the rotor 21 at a second end of the rotor 21 along the direction of a rotational axis. The first bearing 66a has a first inner race 71a, a first outer race 71b and a first rolling element 71c. The second bearing 66b has a second inner race 72a, a second outer race 72b and a second rolling element 72c. In this embodiment, the first inner race 71a and the second inner race 72a are made of a material that is harder than a material from which the hub shaft 15 is made.

The first inner race 71a is attached to the hub axle 15. The first outer race 71b is attached to the rotor 21. The first rolling element 71c is arranged between the first inner race 71a and the first outer race 71b. The first inner race 71a is arranged such that it contacts the movement restricting section 68 as explained previously. The first inner race 71a is attached to an external circumferential surface of the hub axle 15 with an interference fit (friction-fit or press-fit). Thus, the first inner race 71a is fixed to an external circumferential surface of the hub axle 15 by press fitting such that it contacts the movement restricting section 68. The first outer race 71b is clearance fitted (loosely fitted) into a first bearing housing section 21c of the rotor 21 such that movement of the first outer race 71b toward the second bearing 66b is restricted. The first bearing housing section 21c is a recessed portion formed in an internal circumferential surface of the magnet holding section 21b at a first end of the rotor 21. It is acceptable for a side face of first outer race 71b that faces toward the second bearing 66b to contact a step portion of the recessed portion of the magnet holding section 21b or to be slightly separated from the step portion of the recessed portion of the magnet holding section 21b.

The second inner race 72a is attached to the hub axle 15. The second outer race 72b is attached to the rotor 21. The second rolling element 72c is arranged between the second inner race 72a and the second outer race 72b. The second inner race 72a is arranged with the spacer 67 disposed between the second inner race 72a and the first inner race 71a. The second inner race 72a is attached to an external circumferential surface of the hub axle 15 with a clearance fit. The second inner race 72a is arranged between the spacer 67 and the first boss section 36a of the case body 36 and cannot move in an axial direction of the hub. In this embodiment, the first inner race 71a and the second inner race 72a are made of a material that is harder than a material from which the hub shaft 15 is made.

If the internal diameters of the first inner race and the second inner race are identical, then a second mounting portion 15h where the second inner race 72a is attached to the hub axle 15 is formed to have a slightly smaller external diameter than first mounting portion 15g where the first inner race 71a is attached. As a result, the second inner race 72a can be attached with a clearance fit. In FIG. 3, the difference between the external diameters of the first mounting portion 15g and the second mounting portion 15h is depicted to be larger than it actually is in order to make the difference easier to recognize in the drawing. If the internal diameter of the first inner race is slightly larger than the internal diameter of the second inner race, then the first mounting portion 15g and the second mounting portion 15h can be formed to have equal external diameters. The second outer race 72b is interference fitted into a second bearing housing section 21d of the rotor 21. The second bearing housing section 21d is a recessed portion formed in an internal circumferential surface of the magnet holding section 21b at a second end of the rotor 21. Thus, the second outer race 72b is press fitted into the second bearing housing section 21d such that it is fixed in place. A side face of the second outer race 72b that faces toward the first outer race 71b contacts a step portion of the recessed portion of the magnet holding section 21b. The step portion of the recessed portion of the magnet holding section 21b positions the second outer race 72b on the magnet holding section 21b.

A step 15i exists between a portion of the hub axle 15 where the second mounting portion 15h is formed and a portion where the second externally threaded section 15b is formed. The step 15i is positioned farther toward the first bearing 66a than an end face of the second bearing 66b that faces away from the first bearing 66a. Also, a boundary portion 15j between the first mounting portion 15g and the second mounting portion 15h is positioned farther toward the first bearing 66a than an end face of the second bearing 66b that faces toward the first bearing 66a.

The spacer 67 is a cylindrical member made of metal that is arranged between the first inner race 71a and the second inner race 72a. An internal diameter of the spacer 67 is a larger than an external diameter of the hub axle 15. An external diameter of a portion of the spacer 67 that contacts the first inner race 71a is smaller than an internal diameter of the first outer race 71b. An external diameter of a portion of the spacer 67 that contacts the second inner race 72a is smaller than an internal diameter of the second outer race 72b. In this embodiment, the external diameter of the spacer 67 is smaller than the external diameters of the first inner race 71a and the second inner race 72a. The spacer 67 serves to suppress movement of the second inner race 72a of the second bearing 66b (which is clearance fitted onto the hub axle 15) in the axial and rotational directions. In order to achieve the suppression of movement, the second lock nut 52 functions as the pressing section 69 by imposing a pressure against the second inner race 72a. As explained previously, the second lock nut 52 serves to fasten the case body 36 to the hub axle. When the second lock nut 52 is tightened, the second lock nut 52 presses against the case body 36 and the first boss section 36a of the case body 36 presses against the second inner race 72a. When the second inner race 72a is pressed such that it contacts the spacer 67, a pressure is imposed on the second inner race 72a by the second lock nut 52 because the spacer 67 cannot move any farther. Thus, movement of the second inner race 72a is restricted in the axial direction of the hub and the rotational direction. As a result, the first inner race 71a and the second inner race 72a do not easily slip with respect to the hub axle 15 and the first inner race 71a and the second inner race 72a are less likely to become worn. Although in this embodiment the second inner race 72a contacts the case body 36, it is acceptable to provide an annular member between the case body 36 and the second inner race 72a such that the case body 36 presses the second inner race 72a through the annular member.

As shown in FIG. 2, the rotation transmitting mechanism 25 reduces the speed of rotation from the rotor 21 before transmitting the rotation to the second case member 34. Conversely, during regenerative braking, the rotation transmitting mechanism 25 increases the speed of rotation from the second case member 34 before transmitting the rotation to the rotor 21. The rotation transmitting mechanism 25 has a planetary gear mechanism 48. The planetary gear mechanism 48 is an example of a speed reducing mechanism. The planetary gear mechanism 48 includes a sun gear 48a, an internal gear 48b and a plurality of (e.g., three) planet gears 48c. The sun gear 48a is fixed to the rotor 21. The sun gear 48a is coupled to the magnet holding section 21b of the rotor 21 by bolt members 55 such that the sun gear 48a can rotate as an integral unit with the rotor 21. The internal gear 48b is arranged around an outer circumference of the sun gear 48a. The internal gear 48b is coupled non-rotatably to the gear mounting section 35 of the case body 36. The planet gears 48c are arranged to mesh with both the sun gear 48a and the internal gear 48b. The planet gears 48c are rotatably supported by a carrier 48d. Each of the planet gears 48c has two gear sections, i.e., a first gear section 56a and a second gear section 56b, having different tooth counts. The first gear section 56a meshes with the sun gear 48a, and the second gear section meshes with the internal gear 48b. The carrier 48d is fixed to an inward side face of the circular plate-like section 34c of the second case member 34. With this planetary gear mechanism 48, since the case body 36 in which the internal gear 48b is provided is fixed non-rotatably to the hub axle 15, rotation of the sun gear 48a (which is connected to the rotor 21) is reduced to a lower speed and transmitted to the second case member 34.

When the rotor 21 is installed on the hub shaft 15, first, the first bearing 66a is press fitted onto the first mounting portion 15g of the hub axle 15. An appropriate tool is used to press fit the first bearing 66a such that the first inner race 71a contacts the movement restricting section 68. The second outer race 72b of the second bearing 66b is press fitted into the second bearing housing section 21d of the magnet holding section 21b of the rotor 21. Here, too, an appropriate tool is used to press fit the second bearing such that the second outer race 72b contacts a wall surface of the second bearing housing section 21d. After the first bearing 66a is attached to the hub axle 15 and the second bearing 66b is attached to the rotor 21, the spacer 67 is installed on the external circumference of the hub axle 15 such that the spacer 67 contacts the first inner race 71a.

With the second bearing 66b attached, the rotor 21 is then installed onto the hub axle 15. During the installation of the rotor 21, the first outer race 71b of the first bearing 66a is fitted into the first bearing housing section 21c and the second inner race 72a of the second bearing 66b is fitted onto an external circumferential surface of the hub axle 15. Next, the first boss section 36a of the case body 36 (in which the stator 22 is installed in advance) is mated with the rotation stop section 15e of the hub axle 15. The second lock nut 52 screwed onto the second externally threaded section 15b and tightened such that the first boss section 36a presses against the second inner race 72a. The second lock nut 52 is tightened beyond a point where the second inner race 72a contacts the spacer 67 such that the second inner race 72a is pressed between the spacer 67 and the first boss section 36a due to the first boss section 36a being pressed by the second lock nut 52. Thus, movement of the second inner race 72a is restricted in the axial direction of the hub and the rotational direction. As a result, wear of the hub axle 15 and the second inner race 72a can be reduced.

In the first embodiment, the first inner race 71a and the second outer race 72b are interference fitted and the first outer race 71b and the second inner race 72a are clearance fitted. However, the internal motorized bicycle hub of the present disclosure is not limited to such a configuration.

Figure 4:
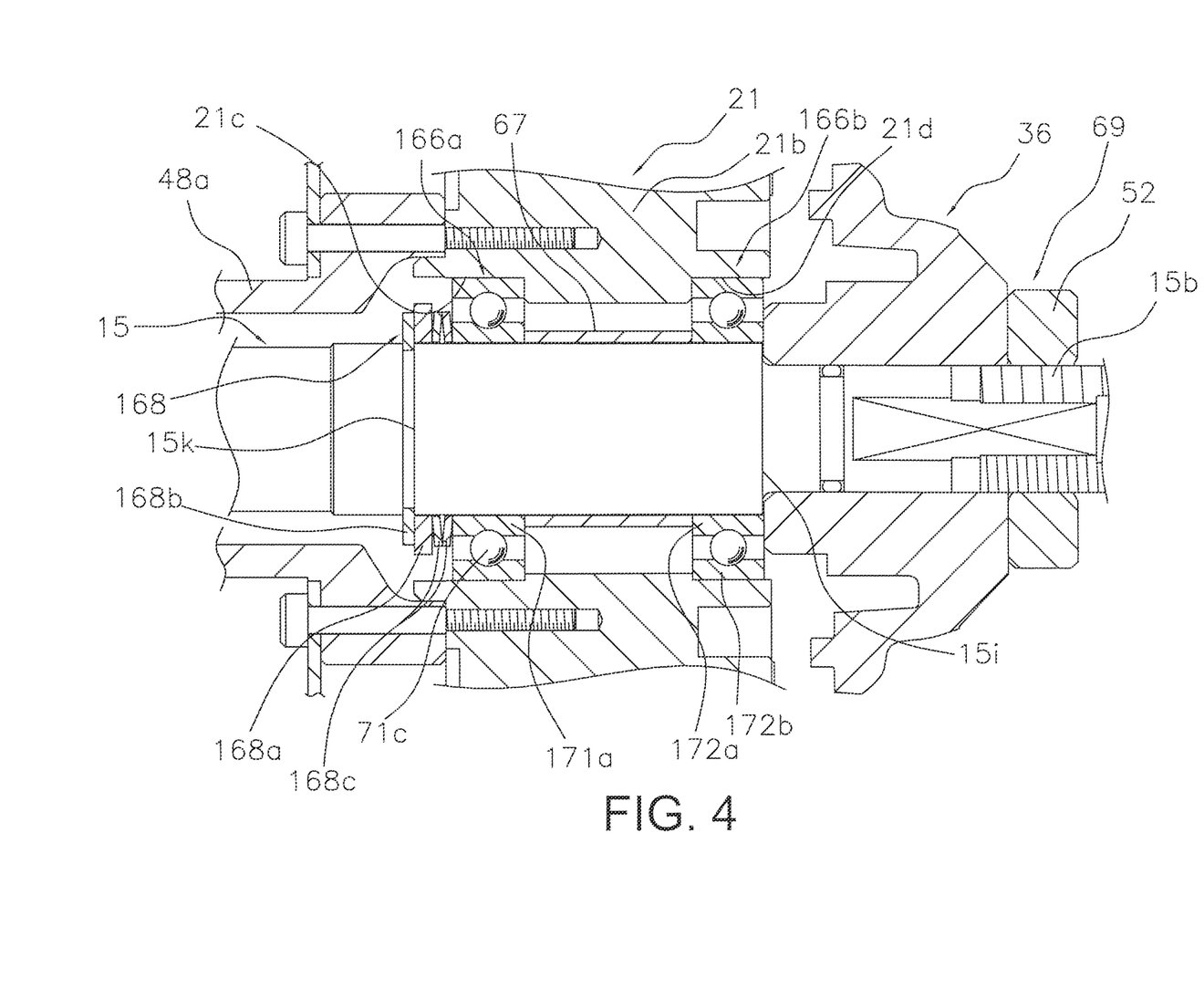
FIG. 4 is an enlarged cross sectional view, corresponding to FIG. 3, of a rotor support portion of an internal motorized bicycle hub in accordance with a second embodiment.

FIG. 4 shows a second embodiment in which the outer races of both a first bearing 166a and a second bearing 166b are interference fitted and both of the inner races are clearance fitted. More specifically, the first outer race 171b is press fitted into a first bearing housing section 121c of the magnet holding section 21b, and the second outer race 172b is press fitted into a second bearing housing section 121d of the magnet holding section 21b. The first inner race 171a and the second inner race 172a are each attached to an external circumferential surface of the hub axle 15 with a clearance fit. In the second embodiment, the movement restricting section 168 has an attaching member 168a that is detachably attached to an external circumferential surface of the hub axle 15. A retaining ring 168b attached to an annular groove 15k formed in an external circumferential surface of the hub axle 15 prevents the mounting member 168a from coming off. Two belleville springs 168c, for example, are arranged between the attaching member 168a and the first inner race 171a. The step 15i of the hub axle 15 is located in the same position as in the first embodiment.

With these constituent features, before the rotor 21 is installed onto the hub axle 15, the first bearing 166a and the second bearing 166b are press fitted into the first bearing housing section 21c and the second bearing housing section 21d of the magnet holding section 21b. The spacer 67 is then arranged between the first inner race 171a and the second inner race 172a. In this state, the rotor 21 is then attached to the hub axle 15. Next, the first boss section 36a of the case body 36 (in which the stator 22 is installed in advance) is engaged with the rotation stop section 15e of the hub axle 15. The second lock nut 52 screwed onto the second externally threaded section 15b and tightened such that the first boss section 36a presses against the second inner race 172a. The second lock nut 52 is tightened such that the second inner race 172a presses against the first inner race 171a through the spacer 67 and causes the belleville springs 168c to flex. In this way, the first inner race 171a, the spacer 67, and the second inner race 172a are put into a compressed state between the first boss section 36a and the belleville springs 168c and movement of the first inner race 171a and the second inner race 172a is restricted in the rotational direction and the axial direction of the hub. As a result, wear of the first inner race 171a, the second inner race 172a, and the hub axle 15 can be reduced.

Figure 5:
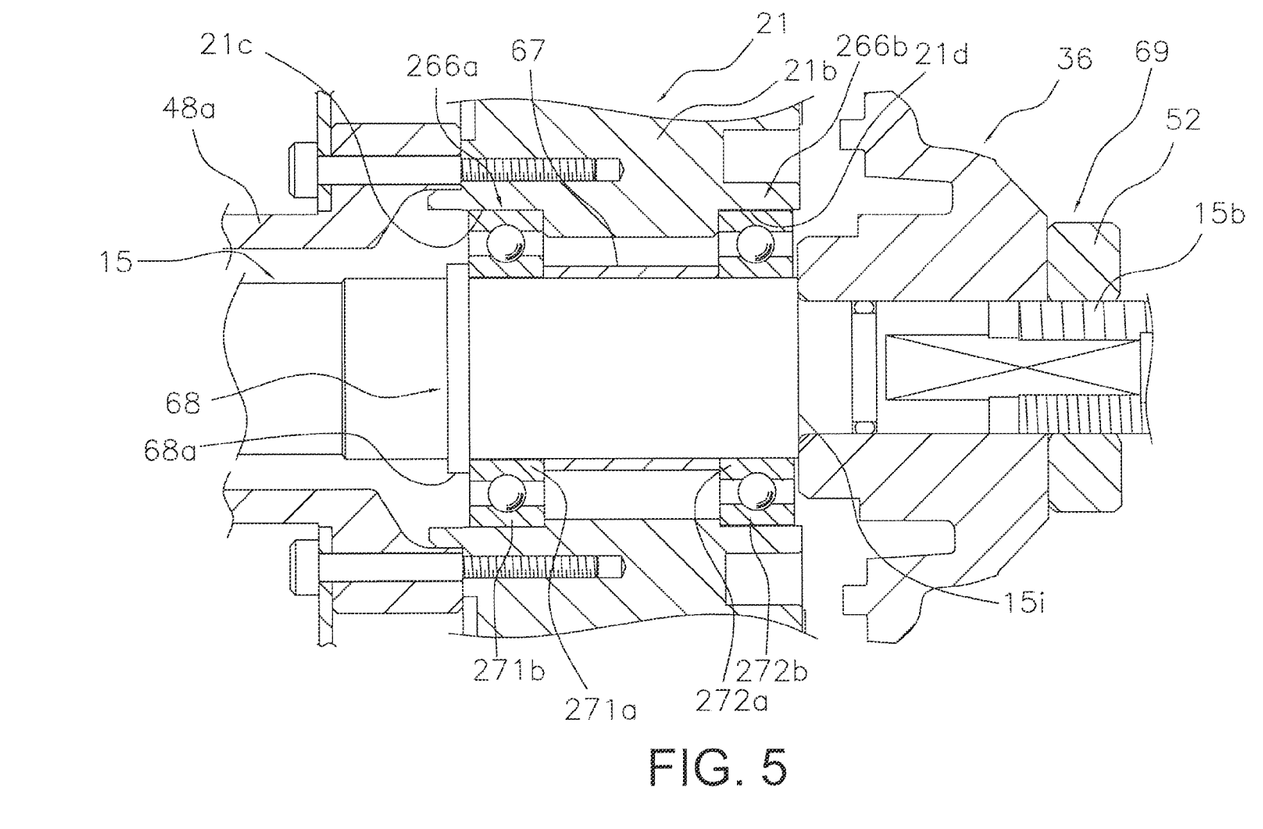
FIG. 5 is an enlarged cross sectional view, corresponding to FIG. 3, of a rotor support portion of an internal motorized bicycle hub in accordance with a third embodiment.

Although in the first and second embodiments the second bearings 66b and 166b are pressed with a pressing section 69, the internal motorized bicycle hub of the present disclosure is not limited to such a configuration. FIG. 5 shows a third embodiment in which a first outer race 271b of a first bearing 266a is interference fitted into the first bearing housing section 21c and a first inner race 271a is clearance fitted onto the hub axle. A second outer race 272b of a second bearing 266b is clearance fitted into the second bearing housing section 21d and the second inner race 272a is interference fitted onto an external circumferential surface of the hub axle 15. Thus, the first outer race 271b is press fitted into the first bearing housing section 21c and the second inner race 272a is press fitted onto the hub axle 15. Also, the first bearing 266a and the second bearing 266b are configured such that at least their internal diameters are different. Unlike the first and second embodiments, in the third embodiment the step 15i is positioned such that a gap exists between the first boss section 36a and the second inner race 272a. Also, since the second inner race 272a is fixed to being press fitted, it applies pressure to the spacer 67. Although in this embodiment a gap is provided between the first boss section 36a and the second inner race 272a, it is acceptable for the step 15i to be formed such that the first boss section 36a and the second inner race 272a contact each other.

With such an arrangement, the rotor 21 is attached to the hub axle 15 after the first bearing 266a has been press fitted into the first bearing housing section 21c. Then, the spacer 67 is installed, followed by press fitting the second bearing 266b onto the hub axle 15. The spacer 67 is press fitted such that it presses against the first bearing 266a. Thus, the first inner race 271a of the first bearing 266a is always pressed toward the movement restricting section 68. As a result, movement of the first inner race 171a and the second inner race 172a is restricted in the rotational direction and axial direction of the hub. As a result, wear of the first inner race 271a, the second inner race 272a, and the hub axle 15 can be reduced.

While only selected embodiments have been chosen to illustrate the present invention, it will be apparent to those skilled in the art from this disclosure that various changes and modifications can be made herein without departing from the scope of the invention as defined in the appended claims.

Although the previously explained embodiments disclose an internal motorized bicycle hub for a front wheel, the internal motorized bicycle hub can also be applied to an internal motorized bicycle hub for a rear wheel.

Although in the previously explained embodiments ball bearings are disclosed as the roller bearings, the roller bearings are not limited to ball bearings.

The mechanical features of the motor 11 are not limited to those of the previously explained embodiments. For example, although the motor of the previously explained embodiment has an inner rotor, it is acceptable for to use a motor having an outer rotor.

Although in the previously explained embodiments the protrusion of the movement restricting section 68 is formed as an integral part of the hub axle, the present invention is not limited to such a configuration. It is acceptable for the protrusion to be either an integral part of the hub axle or a separate entity. Any protrusion configuration is acceptable so long as it protrudes from an external circumferential surface and restricts movement of the first inner race. For example, it is acceptable to provide a plurality of protrusions arranged in a radial fashion. However, the work required to assemble the hub can be reduced by providing an annular protrusion formed as an integral part of the hub axle.

Thus, the foregoing descriptions of the embodiments of the internal motorized bicycle hub are provided for illustration only, and not for the purpose of limiting the invention as defined by the appended claims and their equivalents.

What is claimed is:

1. An internal motorized bicycle hub comprising:
a hub axle;
a motor including a rotor rotatably mounted on the hub axle and a stator non-rotatably arranged with respect to the hub axle and disposed around an outer perimeter of the rotor;
a first bearing rotatably supporting the rotor on the hub axle, the first bearing including a first inner race attached to the hub axle, a first outer race attached to the rotor, and a first rolling element arranged between the first inner race and the first outer race, the first outer race being attached to the rotor with a clearance fit, and the first inner race being attached to the hub axle with an interference fit;
a second bearing rotatably supporting the rotor on the hub axle and spaced apart from the first bearing along an axial direction of the hub axle, the second bearing including a second inner race attached to the hub axle, a second outer race attached to the rotor, and a second rolling element arranged between the second inner race and the second outer race, the second outer race being attached to the rotor with an interference fit, and the second inner race being attached to the hub axle with a clearance fit;
a spacer arranged between the first inner race and the second inner race; and
a movement restricting section that restricts movement of the first inner race in a direction of separating from the second bearing, the spacer pressing the first bearing towards the movement restricting section.

2. The internal motorized bicycle hub according to claim 1, further comprising
a pressing section that presses the second inner race toward the spacer.

3. The internal motorized bicycle hub according to claim 2, wherein
the pressing section is a nut member that is screwed onto the hub axle.

4. The internal motorized bicycle hub according to claim 1, wherein
the movement restricting section has a protrusion that protrudes from an external circumferential surface of the hub axle and that contacts the first inner race.

5. The internal motorized bicycle hub according to claim 4, wherein
the protrusion is formed as an integral part of the hub axle.

6. The internal motorized bicycle hub according to claim 1, wherein the movement restricting section has an attaching member that is detachably attached to an external circumferential surface of the hub axle.

7. The internal motorized bicycle hub according to claim 1, wherein
the hub axle is made of an iron-based m I that has not been quench hardened.

8. The internal motorized bicycle hub according to claim 1, wherein
the internal motorized bicycle hub is a front wheel hub.

9. The internal motorized bicycle hub according to claim 1, further comprising
a speed reducing mechanism connected to the rotor to reduce a rotational speed of the rotor.

* * * * *